Figure 1:
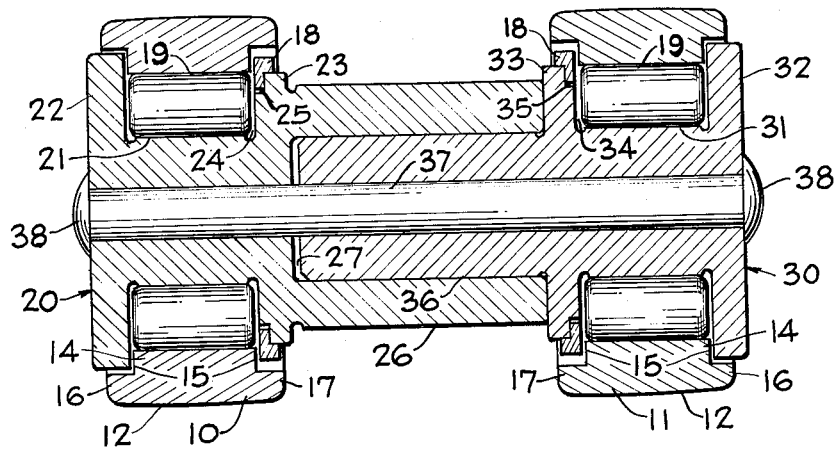

March 28, 1961   R. J. GALES   2,977,163
ROLLER ASSEMBLY
Filed Sept. 22, 1959

RICHARD J. GALES
*INVENTOR.*

BY *Albert Sperry*

ATTORNEY

United States Patent Office 2,977,163
Patented Mar. 28, 1961

2,977,163

ROLLER ASSEMBLY

Richard J. Gales, Morrisville, Pa., assignor to Accurate Bushing Company, Garwood, N.J., a corporation of New Jersey Filed Sept. 22, 1959, Ser. No. 841,615

2 Claims. (Cl. 308—207)

This invention relates to bearings and bearing assemblies, and is particularly concerned with the anti-friction mounting of multiple coaxial elements preferably in spaced parallel relation, as for instance rollers for mobile members.

In the anti-friction mounting of movable members generally and particularly doors, closures, shutters and the like, it has long since been the practice to provide supporting, sustaining, or guiding rollers in spaced pairs designed for contact with spaced parallel tracks or runway surfaces, such rollers being disposed on the opposite sides of the intermediately disposed member.

Present day assemblies of this type conventionally employ a central axle, extending through and secured to the movable member to protrude from its opposite side surfaces. Separate complete bearing assemblies are then mounted to and secured to the protruding ends of such axle, each assembly including inner and outer races with anti-friction bearings therebetween. The rollers themselves, either constitute the outer races or are secured to separate outer races.

With such arrangements, difficulty has been experienced in the assembly and replacement of the rollers and/or their bearings without displacement of the guided member from its operative location. A specific illustration of this problem is in connection with the iris type of after-burner shutter for jet engines, as used in aviation. In this instance the bearing assemblies are, of course, subjected to intense heat and consequent rapid deterioration. Where replacement of the bearings and/or rollers entails time consuming and expensive operations, such as removal of the actuating clevis on which they are mounted, or separate detachment of each bearing assembly, or removal of a central axle, the operation is practically prohibitive in time and expense—a replacement of the entire clevis with its bearing assemblies being more economical.

The present invention seeks to ameliorate bearing replacement difficulties by the provision of a simple dual bearing arrangement, readily applicable to a clevis or equivalent intermediate element, by application or removable from the opposite sides of such intermediate member without displacement thereof from its operative position. An important feature of the inventive concept is the provision of means whereby the assembly may be engaged and interlocked through the intermediate member without necessity of a separate central axle, and without disassembly of the bearings or removal of the rollers. Thus assembly, replacement and repairs may be accomplished expeditiously and with due regard to economies of time, labor and materials.

While the present inventive concept may be widely and variously embodied in numerous structural adaptations, it is here presented by way of illustration in one of its commercially successful forms as an assembly for the mounting of parallel coaxial rollers for supporting, guiding and sustaining the actuating clevis of an iris type of after-burner shutter for jet engines. In this form of the invention, spaced parallel coaxial rollers of uniform diameter are mounted for anti-frictional rotation as the outer races of coaxial and parallel bearings. The inner race of one of such bearings is constituted by a body defining a cylindrical receptor for telescopically receiving a conforming shank defined by the inner race body of the companion bearing. In assembly, the cylindrical receptor is disposed through and seated within the intermediate clevis, or equivalent member, with its roller and bearing appropriately positioned at one side thereof. Thereafter the conforming shank of the body of the companion inner race is inserted from the opposite side of the clevis with its roller and bearing properly disposed on said opposite side in coaxial parallel relation. Securement of the receptor and shank in telescopic relation, is by way of a central coaxial securing element in the nature of an elongate rivet, stud or bolt. An important feature of the invention is the fact that the united cylindrical receptor body and shank body constitute an axle otherwise generally required as a separate part. It will, of course, be understood that the invention is in no way limited to this particular embodiment in which the rollers are of uniform diameter, in which the receptor or conforming shank is externally or internally cylindrical, and in which the companion races are interlocked and secured by a rivet.

It will thus be seen that it is among the primary objects of the present invention to provide a novel, simple and improved bearing assembly for the anti-friction mounting of parallel anti-friction elements on the opposite sides of an intermediate element. Numerous other objects, features and advantages of the present invention will be apparent from a consideration of following specifications, taken in conjunction with the accompanying drawings, in which—

Figure 2:
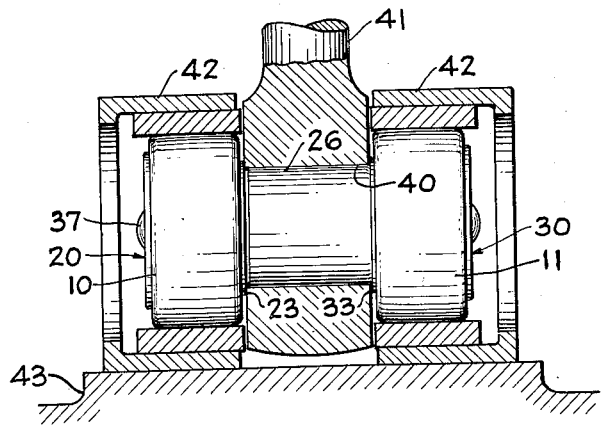

Fig. 1 is a longitudinal section illustrating one form of the present invention; and Fig. 2 is a similar section of that form of the invention shown in Fig. 1, as applied to an intermediate element in the form of an actuating clevis of the type used with an iris type after-burner shutter for jet engines.

In the drawings the left and right hand coaxial parallel rollers are indicated by the numerals 10 and 11 respectively. Each roller has a generally flat peripheral face 12 for contact with the tracks, guides or runways of the surface over which the mobile member is to move. The rollers 10 and 11 are preferably identical in construction, each being formed with an internal annular outer race 14 defined between sidewalls 15 rabbetted inwardly from the side walls of the rollers to form outwardly extended shoulders 16 and 17 spaced radially inward from the peripheral faces 12. The shoulders 17 of the rollers are formed to accommodate conventional snap-rings 18 securing the rollers against displacement after assembly. It will, of course, be noted that the identical construction of the rollers provides a marked economy in manufacture. However, the rollers are oppositely placed in such manner that the deeper shoulder 17 of each roller is disposed inwardly.

The anti-friction bearings of the present assembly are likewise preferably uniform for both rollers 10 and 11 and are here shown as constituted by simple elongate cylinders 19 disposed in circular series within the rollers and having external contact with the races 14 of the rollers. The left hand roller 10 is mounted through its bearings 19 upon the inner race body generally indicated by the numeral 20 defining the cylindrical receptor. The race 21 of the body 20 is formed by a cylindrical surface defined between an outer flange 22 and an inner shoulder 23, the flange and shoulder forming an annular bearing cavity 24. The outer peripheral edge of shoulder 23 is rabbetted as at 25 to receive the inner flange of the snap-ring 18, the outer periphery of which secures the roller against axial inward movement after the roller bearings have been assembled. Inwardly from the shoulder 23 the body 20 is formed with a hollow cylinder 26 defining a receptor bore 27. In this form of the invention, the length of the receptor cylinder 26 extending from the outer face of the shoulder 23 is preferably of equal length to the internal bore of the intermediate member upon which the anti-frictional rollers are to be mounted. For the purposes of simplicity in manufacture and assembly, both the internal and external surfaces of the receptor cylinder 26 are circular and of uniform diameter. This characteristic may be departed from, however, where it is desired to retain the inner race bodies against possible rotation within the intermediate member through which they are mounted, or with respect to each other.

The opposed shanked and telescopic race body for mounting the right hand roller 11 is generally identified by the numeral 30, and is formed substantially in the manner of the race of the receptor body 20. The body 30 thus includes an inner race surface 31, a flange 32, and an opposed shoulder 33 between which is defined the annular bearing cavity 34 as in the manner of the left hand construction identified by numerals 21, 22, 23 and 24. Likewise, shoulder 33 is formed with a peripheral rabbet 35 for the reception of the retaining split ring 18. The right hand inner race body 30, however, differs from the left hand inner race body 20, in that it is formed with a shank 36 conforming in cross section with the bore 27 of the cylinder 26 of the companion left hand body 20. The length of the shank 36 is preferably equal to the depth of the bore 27 so that upon telescopic insertion of the shank 36 within the bore 27 a substantially solid intermediate portion for the total assembly is formed. As shown, after assembly the bodies are united in their telescopic relation by a rivet 37 extending through a concentric bore of both bodies, the heads 38 of the rivet 37 being flattened against the outer faces of the central portions of the bodies 20 and 30.

In preassembly of the individual bearing elements, it will be seen that by virtue of the smaller diameters of the inner shoulders 23 and 33 of the receptor inner race 20 and the shanked inner race 30, respectively, the bearings 19 may be inserted between the shoulders in the bearing cavities 24 or 34 and the rollers 10 and 11 applied over the bearings by movement over the shoulders 23 and 33 towards the flanges 22 or 32 with the shoulders 16 overlying such flanges. The snap rings 18 are then applied, precluding inadvertent opposite movement of the rollers.

With the individual bearing assemblies thus individually completed, the inner race bodies 20 and 30 may be united to form a single dual bearing. The cylinder 26 of the receptor inner race body 20 is inserted through the bore 40 of an intermediate member 41 which is to be supported, guided or sustained for movement over tracks or ways 42 of a relatively fixed structure 43. After insertion of the cylinder 26 in the bore 40 of the member 41, with which it conforms to snugly fit therein, the opposite companion inner race body 30 is mounted with its shank telescopically fitted within the cylinder 27 of the body 20. It will be noted that in such assembled combination, the confronting faces of the shoulders 23 and 33 may frictionally engage the peripheral faces of the member 41 adjacent its bore 40. However, the rollers being outwardly spaced from such shoulders will be free to rotate on their bearings. After the telescopic interconnection of the inner race bodies, the rivet 37 may be applied to retain the complete bearing assembly in proper position with the rollers in coaxial parallel relation on the opposite sides of the intermediate member.

When it becomes necessary to replace the rollers, bearings or entire assembly, it is a simple matter to remove the rivet and disengage the assembly simply by lateral separation, the shank 36 being free to move outwardly from telescopic fit within the cylinder 26. Thus in both assembly and disassembly the intermediate member need not be removed from its operative location. A further feature of the invention is the fact that this structural arrangement permits individual replacement of either the right hand or left hand bearing assembly.

From the foregoing it will be seen that the present invention provides a novel and simple bearing assembly for the mounting of spaced parallel pairs of coaxial rollers. Since the rollers are not only uniform in every characteristic but since the inner race bodies themselves are alike as to their inner race construction, simplicity and economy of manufacture is assured. The cylinder of the receptor inner race and the shank of the opposite inner race are preferably interfitted to form a solid internal structure—thus great strength and rigidity is accomplished. Obviously, the invention is not limited nor confined to specific details such as the split lock rings, the rivet, or the type of antifriction bearing herein shown. Therefore, numerous changes, modifications and the full use of equivalents may be resorted to in the practice of the invention without departure from the spirit or scope of the invention as outlined in the appended claims.

I claim:

1. A double roller bearing including a pair of spaced coaxial rollers of uniform diameter each defining the outer race of an anti-friction bearing, an inner race element for each roller, anti-friction bearings between each roller and its inner race element and means for uniting said inner race elements by axial movement of said rollers toward each other, said means including a cylinder formed on one inner race element, a shank formed on the other race element and received within said cylinder, and fastening means passing axially through both of said inner race elements.

2. A double roller bearing including a pair of spaced coaxial rollers of uniform diameter each defining the outer race of an anti-friction bearing, an inner race element for each roller, anti-friction bearings between each roller and its inner race element and means for uniting said inner race elements by axial movement of said rollers toward each other, said means including a cylinder formed on one inner race element, a shank formed on the other race element, and a central rivet passing axially through both of said inner race elements, said shank interfitting said cylinder to form a solid intermediate structure spacing said rollers apart.

References Cited in the file of this patent
UNITED STATES PATENTS

| | | |
|---|---|---|
| 709,441 | Henderson | Sept. 16, 1902 |
| 729,656 | Penprase | June 2, 1903 |
| 1,876,904 | Francis | Sept. 13, 1932 |
| 2,863,701 | Jones et al. | Dec. 9, 1958 |
| 2,880,878 | Collette | Apr. 7, 1959 |
| 2,892,419 | King | June 30, 1959 |